United States Patent
Maruta et al.

(10) Patent No.: US 6,596,436 B1
(45) Date of Patent: Jul. 22, 2003

(54) NICKEL POSITIVE ELECTRODE PLATE FOR ALKALINE STORAGE BATTERIES AND METHOD FOR PRODUCING THE SAME

(75) Inventors: Masayoshi Maruta, Wakayama (JP); Yoshiyuki Muraoka, Kadoma (JP); Masumi Katsumoto, Chigasaki (JP); Fumihiko Yoshii, Fujisawa (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 296 days.

(21) Appl. No.: 09/763,566

(22) PCT Filed: Jun. 12, 2000

(86) PCT No.: PCT/JP00/03822
§ 371 (c)(1),
(2), (4) Date: May 3, 2001

(87) PCT Pub. No.: WO01/01504
PCT Pub. Date: Jan. 4, 2001

(30) Foreign Application Priority Data

Jun. 30, 1999 (JP) .......................................... 11-184934

(51) Int. Cl.$^7$ ................................................. H01M 4/32
(52) U.S. Cl. ...................... 429/223; 429/235; 429/236; 429/218.1; 429/233; 29/623.3; 29/623.5; 29/623.1
(58) Field of Search ................................. 429/223, 235, 429/236, 218.1, 233; 29/623.3, 623.5, 623.1

(56) References Cited

U.S. PATENT DOCUMENTS 6,548,210 B1 * 4/2003 Shinyama et al. .......... 429/223

FOREIGN PATENT DOCUMENTS

| EP | 0 774 793 A1 | 5/1997 |
| EP | 0 863 562 A1 | 9/1998 |
| EP | 0 878 858 A1 | 11/1998 |
| JP | 48-50233 | 7/1973 |
| JP | 05174831 A | 7/1993 |

* cited by examiner

Primary Examiner—Patrick Ryan
Assistant Examiner—Angela J Martin
(74) Attorney, Agent, or Firm—Akin, Gump, Strauss, Hauer & Feld, L.L.P.

(57) ABSTRACT

The present invention provides a sintered nickel positive electrode plates for alkaline storage batteries with a high capacity density in which the working voltage during discharge is kept from dropping and the utilization of the positive electrode active material remains high even at high temperatures. The electrode comprises a porous sintered nickel substrate and metal hydroxides mainly composed of nickel hydroxide impregnated in the substrate, the metal hydroxides including: a first layer comprising a hydroxide of at least one element selected from the group consisting of yttrium, ytterbium and lutetium, and being in contact with the substrate; a second layer comprising a mixture of nickel hydroxide and cobalt hydroxide, and covering the first layer; and a third layer comprising cobalt hydroxide and covering the second layer.

6 Claims, 3 Drawing Sheets

NICKEL POSITIVE ELECTRODE PLATE FOR ALKALINE STORAGE BATTERIES AND METHOD FOR PRODUCING THE SAME

TECHNICAL FIELD

The present invention relates to nickel positive electrode plates for alkaline storage batteries like nickel-cadmium storage battery and nickel-metal hydride storage battery and a method for producing the same.

BACKGROUND ART

With growing uses of alkaline storage batteries, there is an increasing need for weight reduction, size reduction and improvement in performance of those batteries. Especially needed are nickel positive electrode plates for use in electric vehicle batteries that can be charged and discharged in a short time and which is high in utilization of active material at a high temperature and has a long cycle life.

The positive electrode plate that has been used for rapid charging alkaline storage batteries is generally a sintered-type nickel electrode that is low in internal resistance and excellent in cycle characteristics. This sintered type nickel electrode is mixed with cadmium or cobalt to improve the utilization of active material at a high temperature.

Recently, however, regulations are getting tightened on the use of cadmium compounds as awareness of the environmental preservation is rising. Furthermore, the nickel-metal hydride storage battery in which the negative electrode comprising a hydrogen storage alloy as main material is used is known to have this problem. That is, the cadmium compound added to the positive electrode migrates and covers the surface of the negative electrode in charge and discharge cycles, hindering the working of the negative electrode in charge and discharge.

In making a positive electrode with a cobalt compound, meanwhile, a large quantity of expensive cobalt has to be added to secure sufficient characteristics. Another problem is that the addition of cobalt in a large quantity causes the voltage to drop during discharging.

A solution to those problems was disclosed in Japanese Laid-Open Patent Publication No. Sho 48-50233, for example. The technique includes adding an yttrium compound such as yttrium hydroxide to the nickel positive electrode to raise the utilization of active material at a high temperature without causing the utilization of active material at room temperature to drop. The positive electrode with yttrium hydroxide added thereto can be prepared as follows, for example. Sintered nickel substrate is dipped in an acidic aqueous solution containing a nickel salt and an yttrium salt, and dried, and then dipped in an alkaline aqueous solution to convert the nickel salt and yttrium salt into hydroxides. This series of treatments is repeated until a desired amount of active material is produced.

The problem with the technique is that the amount of yttrium increases and that because nickel hydroxide and yttrium hydroxide are formed in a mixed state, the apparent specific gravity is low and it is impossible to obtain an electrode with a high capacity density.

It is an object of the present invention to provide a sintered-type nickel positive electrode plate for alkaline storage batteries with a high capacity density and a high utilization at a high temperature in which the drop in working voltage during discharging is kept down by using the yttrium compound and cobalt compound in appropriate quantities.

DISCLOSURE OF INVENTION

The present invention provides a nickel positive electrode comprising a porous sintered nickel substrate and metal hydroxides mainly composed of nickel hydroxide impregnated in the substrate, the metal hydroxides including: a first layer comprising a hydroxide of at least one element selected from the group consisting of yttrium, ytterbium and lutetium, and being in contact with the substrate; a second layer comprising a mixture of nickel hydroxide and cobalt hydroxide, and covering the first layer; and a third layer comprising cobalt hydroxide and covering the second layer.

In a preferred mode of the present invention, the hydroxide in the first layer of at least one element selected from the group consisting of yttrium, ytterbium and lutetium is 1 to 4 parts by weight, the amount of cobalt hydroxide in the second layer is 1 to 5 parts by weight, and the amount of cobalt hydroxide in the third layer is 3 to 6 parts by weight, each per 100 parts by weight of the nickel hydroxide.

In another preferred mode of the present invention, the second layer further comprises zinc hydroxide. It is preferable that the amount of zinc hydroxide is 3 to 6 parts by weight per 100 parts by weight of the nickel hydroxide.

The present invention provides a method for producing a nickel electrode plate comprising the steps of:

(1) forming a first layer comprising a hydroxide of at least one element selected from the group consisting of yttrium, ytterbium and lutetium in pores of a porous sintered nickel substrate by conducting at least once a procedure including dipping the substrate in an acidic aqueous solution of a salt of at least one element selected from the group consisting of yttrium, ytterbium and lutetium, followed by drying and dipping the same in an alkaline aqueous solution to convert the salt into a hydroxide, (2) forming a second layer comprising a mixture of nickel hydroxide and cobalt hydroxide on the first layer of the substrate by conducting at least once a procedure including dipping the substrate in an acidic aqueous solution containing a nickel salt and a cobalt salt, followed by drying and dipping the same in an alkaline aqueous solution to convert the nickel salt and cobalt salt into nickel hydroxide and cobalt hydroxide, respectively, and (3) forming a third layer comprising cobalt hydroxide on the second layer by conducting at least once a procedure including dipping the substrate in an aqueous solution of a cobalt salt, followed by drying and dipping the same in an alkaline aqueous solution to convert the cobalt salt into cobalt hydroxide.

The present invention further provides a method for producing a nickel electrode plate comprising the steps of:

(1) forming a first layer comprising a hydroxide of at least one element selected from the group consisting of yttrium, ytterbium and lutetium in pores of a porous sintered nickel substrate by conducting at least once a procedure including dipping the substrate in an acidic aqueous solution of a salt of at least one element selected from the group consisting of yttrium, ytterbium and lutetium, followed by drying and dipping the same in an alkaline aqueous solution to convert the salt into yttrium hydroxide, (2) forming a second layer comprising a mixture of nickel hydroxide, cobalt hydroxide and zinc hydroxide on the first layer of the substrate by conducting at least once a procedure including dipping the substrate in an acidic aqueous solution containing a nickel salt, a cobalt salt and a zinc salt, followed by drying and dipping the same in an alkaline aqueous solution to convert the nickel salt, cobalt salt and zinc salt into nickel hydroxide, cobalt hydroxide and zinc hydroxide, respectively, and (3) forming a third layer comprising cobalt hydroxide on the second layer by conducting at least once a procedure including dipping the substrate in an aqueous solution of a cobalt salt, followed by drying and dipping the same in an alkaline aqueous solution to convert the cobalt salt into cobalt hydroxide.

BEST MODE FOR CARRYING OUT THE INVENTION

Figure 1:
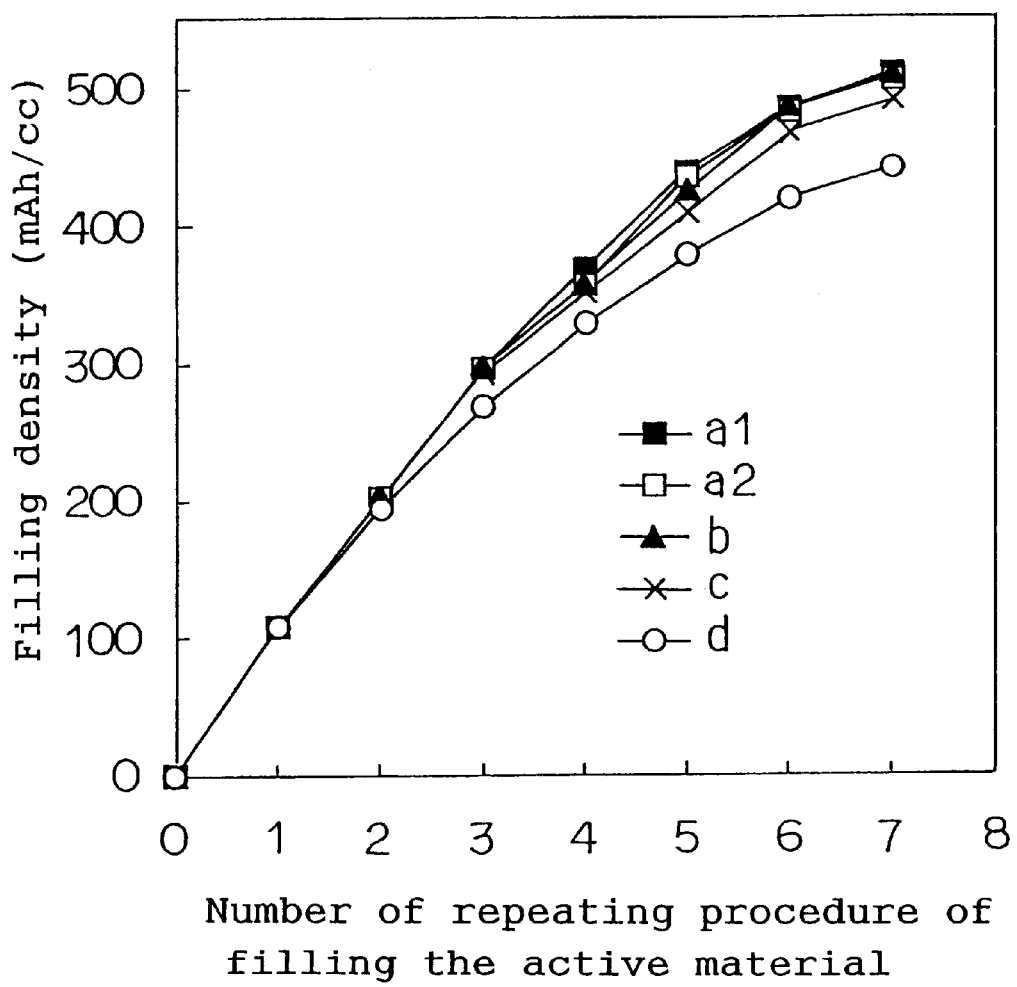
FIG. 1 is a graph illustrating the relation between the number of fillings of active material and the filling density of positive electrodes obtained in different methods.

As described above, the nickel positive electrode according to the present invention has three layers of metal hydroxide within the pores of a sintered nickel substrate. The first layer is a hydroxide layer covering the surface of nickel metal forming the skeleton of the sintered substrate and comprises a hydroxide of at least one element selected from the group consisting of yttrium, ytterbium and lutetium. The second layer comprises a mixture of the active material nickel hydroxide and an electrically conductive agent cobalt hydroxide. The third layer comprises cobalt hydroxide. Because the surface of nickel metal forming the skeleton of the substrate is covered with the hydroxide of at least one element selected from the group consisting of yttrium, ytterbium and lutetium, the oxygen generating potential of the electrode is high. The active material nickel hydroxide contained in the second layer, which is mixed with the electrically conductive agent cobalt hydroxide covers the first layer. Furthermore, the upper side of the second layer is covered with the third layer comprising highly conductive cobalt hydroxide in a small quantity. For this reason, the working voltage during discharging is kept from dropping and the utilization of the positive electrode active material remains high even at high temperatures of not lower than 40° C.

In the above described positive electrode, it is preferable that the hydroxide in the first layer covering the surface of nickel forming the substrate is 1 to 4 parts by weight, the amount of the cobalt hydroxide in the mixture of nickel hydroxide and cobalt hydroxide in the second layer covering the first layer covering is 1 to 5 parts by weight, and the amount of cobalt hydroxide in the third layer thereof is 3 to 6 parts by weight, each per 100 parts by weight of the nickel hydroxide.

If the amount of hydroxide in the first layer is less than one part by weight, the amount of cobalt hydroxide in the second layer is less than one part by weight and the amount of cobalt hydroxide in the third layer is less than 3 parts by weight, no sufficient results of their additions can be obtained. If, on the other hand, the amount of hydroxide in the first layer is more than 4 parts by weight, the amount of cobalt hydroxide in the second layer is more than 5 parts by weight and the amount of cobalt hydroxide in the third layer is more than 6 parts by weight, the amount of the active material nickel hydroxide decreases relatively and the capacity density will be insufficient.

If the second layer containing the active material nickel hydroxide further contains zinc hydroxide, that can prevent the positive electrode from swelling when the battery is overcharged. That keeps the amount of electrolyte from fluctuating in the separator and, as a result, the charge and discharge cycle of battery extends.

Now, the embodiments of the present invention will be described.

Embodiment 1

A sintered nickel substrate with a porosity of 85% sintered in a reducing atmosphere was prepared. The substrate was dipped in an aqueous solution containing 0.3 mol/l of yttrium nitrate and having pH 2.5 at a temperature of 30° C., and then dried well in an 80° C. temperature atmosphere to have the yttrium salt retained in the pores of the substrate. Then, the substrate was dipped in a 25% aqueous solution of sodium hydroxide to convert the yttrium salt into yttrium hydroxide. The substrate was then rinsed well in water to remove the alkaline solution and dried well in an 80° C. temperature atmosphere. In this way, an yttrium hydroxide layer was formed in the pores of the sintered nickel substrate.

Then, the substrate was dipped in an aqueous solution containing 5.5 mol/l of nickel nitrate and 0.06 mol/l of cobalt nitrate and having pH 1.5 at 80° C., and dried well in an 80° C. temperature atmosphere to have the mixture of nickel salt and cobalt salt retained in the pores of the substrate. Then, the substrate was dipped in a 25% aqueous solution of sodium hydroxide at 80° C. to convert the nickel salt and cobalt salt into nickel hydroxide and cobalt hydroxide, respectively. The substrate was then rinsed well in water to remove the alkaline solution and dried. This series of steps for filling active material was repeated 7 times. In this manner, a layer of a mixture of nickel hydroxide and cobalt hydroxide was formed on the upper side of the yttrium hydroxide layer covering the substrate.

Furthermore, this substrate was dipped in an aqueous solution containing 4.0 mol/l of cobalt nitrate and having pH 2.5 at a temperature of 30° C., and dried well in an 80° C. temperature atmosphere to have the cobalt salt retained in the pores of the substrate. The substrate was then dipped in a 25% aqueous solution of sodium hydroxide at 80° C. to convert the cobalt salt into cobalt hydroxide and then rinsed well in water to remove the alkaline solution. In this manner, a cobalt hydroxide layer was formed over the layer of the mixture of nickel hydroxide and cobalt hydroxide.

The nickel positive electrolyte thus obtained shall be called "a1".

Embodiment 2

The same sintered nickel substrate with a porosity of 85% as used in Embodiment 1 was dipped in an aqueous solution containing 0.3 mol/l of yttrium nitrate and having pH 2.5 at a temperature of 30° C., and then dried well in an 80° C. temperature atmosphere. The substrate was then dipped in a 25% aqueous solution of sodium hydroxide at 80° C. to convert the yttrium salt into yttrium hydroxide and then rinsed well in water to remove the alkaline solution, and dried well in an 80° C. temperature atmosphere to form a layer of yttrium hydroxide in the pores of the sintered nickel substrate.

Then, the substrate was dipped in an aqueous solution containing 5.5 mol/l of nickel nitrate, 0.06 mol/l of cobalt nitrate and 0.08 mol/l of zinc nitrate and having pH 1.5 at a temperature of 80° C., and dried well in an 80° C. temperature atmosphere. Then, the substrate was dipped in a 25% aqueous solution of sodium hydroxide at 80° C. to convert the nickel salt, cobalt salt and zinc salt into nickel hydroxide, cobalt hydroxide and zinc hydroxide, respectively. The substrate was then rinsed well in water to remove the alkaline solution and dried. This series of steps for filling active material was repeated 7 times. In this way, a layer of a mixture of nickel hydroxide, cobalt hydroxide and zinc hydroxide was formed on the upper side of the yttrium hydroxide layer.

Furthermore, the substrate was then dipped in an aqueous solution containing 4.0 mol/l of cobalt nitrate and having pH 2.5 at a temperature of 30° C., and dried well in an 80° C. temperature atmosphere. The substrate was dipped in a 25% aqueous solution of sodium hydroxide at 80° C. to convert the cobalt salt into cobalt hydroxide and rinsed well in water to remove the alkaline solution. In this way, a nickel electrode "a2" was produced in this embodiment. Comparative example 1

The same sintered nickel substrate with a porosity of 85% as used in Embodiment 1 was dipped in an aqueous solution containing 5.5 mol/l of nickel nitrate and 0.06 mol/l of cobalt nitrate and having pH 1.5 at a temperature of 80° C., and then dried well in an 80° C. temperature atmosphere. The substrate was then dipped in a 25% aqueous solution of sodium hydroxide at 80° C. to convert the nickel salt and cobalt salt into nickel hydroxide and cobalt hydroxide, respectively, and then rinsed well in water to remove the alkaline solution and dried. This series of steps for filling active material was repeated for 7 times. In this way, a layer of a mixture of nickel hydroxide and cobalt hydroxide was formed in the pores of the substrate.

Then, the substrate was dipped in an aqueous solution containing 4.0 mol/l of cobalt nitrate and having pH 2.5 at a temperature of 80° C., and dried well in an 80° C. temperature atmosphere. Then, the substrate was dipped in a 25% aqueous solution of sodium hydroxide at 80° C. to convert the cobalt salt into cobalt hydroxide. The substrate was then rinsed well in water to remove the alkaline solution. The nickel positive electrode thus obtained in comparative example 1 shall be called "b".

Comparative example 2

The same sintered nickel substrate with a porosity of 85% as used in Embodiment 1 was dipped in an aqueous solution containing 1 mol/l of cobalt nitrate and having pH 2.5 at a temperature of 30° C., and then dried well in an 80° C. temperature atmosphere. The substrate was then dipped in a 25% aqueous solution of sodium hydroxide at 80° C. to convert the cobalt salt into cobalt hydroxide and then rinsed well in water to remove the alkaline solution. In this manner, a cobalt hydroxide was formed in the pores of the sintered nickel substrate.

Then, the substrate was dipped in an aqueous solution containing 5.5 mol/l of nickel nitrate and 0.06 mol/l of cobalt nitrate and having pH 1.5 at a temperature of 80° C., and dried well in an 80° C. temperature atmosphere. Then, the substrate was dipped in a 25% aqueous solution of sodium hydroxide at 80° C. to convert the nickel salt and cobalt salt into nickel hydroxide and cobalt hydroxide, respectively. Then the substrate was rinsed well in water to remove the alkaline solution and dried. This series of steps for filling the active material was repeated for 7 times. In this way, a layer of a mixture of nickel hydroxide and cobalt hydroxide was formed in the pores of the substrate.

Then, the substrate was dipped in an aqueous solution containing 4.0 mol/l of nickel nitrate and having pH 2.5 at a temperature of 30° C., and dried well at 80° C. Then, the substrate was dipped in a 25% aqueous solution of sodium hydroxide at 80° C. to convert the cobalt salt into cobalt hydroxide. The substrate was then rinsed well in water to remove the alkaline solution. A nickel positive electrode "c" was thus obtained in comparative example 2.

Comparative example 3

The same sintered nickel substrate with a porosity of 85% as used in Embodiment 1 was dipped in an aqueous solution containing 5.5 mol/l of nickel nitrate, 0.06 mol/l of cobalt nitrate and 0.3 mol/l of yttrium nitrate and having pH 1.5 at a temperature of 80° C., and then dried well in an 80° C. temperature atmosphere. The substrate was then dipped in a 25% aqueous solution of sodium hydroxide at 80° C. and then rinsed well in water to remove the alkaline solution and dried. This series of steps for filling the active material was repeated for 7 times. In this way, a layer of a mixture of nickel hydroxide, cobalt hydroxide and yttrium hydroxide was formed in the pores of the substrate.

Then, the substrate was dipped in an aqueous solution containing 4.0 mol/l of cobalt nitrate and having pH 2.5 at a temperature of 30° C., and dried well in an 80° C. atmosphere. Then, the substrate was dipped in a 25% aqueous solution of sodium hydroxide at 80° C. to convert the cobalt salt into cobalt hydroxide. The substrate was then rinsed well in water to remove the alkaline solution. A nickel positive electrode "d" was thus obtained in comparative example 3.

Then, alkaline storage batteries A1, A2, B, C and D, each with a nominal capacity of 1.4 Ah were fabricated using the above positive electrodes "a1", "a2", "b", "c" and "d", negative electrodes comprising a hydrogen storage alloy as main material with a composition of $MmNi_{3.5}Co_{0.7}Mn_{0.4}Al_{0.3}$ (Mm: Misch metal, a mixture of rare earth elements), separators made of micro-porous polypropylene film and alkaline electrolytes.

FIG. 1 shows the relation between the number of repeating the procedure of filling the active material nickel hydroxide and the filling density of nickel hydroxide in the electrodes obtained in Embodiments 1 and 2 and comparative examples 1 to 3. The filling density of nickel hydroxide was obtained from capacity values calculated with 289 mAh per g of nickel hydroxide based on a chemical analysis. The filling density was an average of values calculated with three samples for each battery. Table 1 shows the chemical analytic values of the contents of substances in the hydroxides per 100 parts by weight of nickel hydroxide.

TABLE 1

| Positive electrode | First layer (Parts by weight) | Second layer (Parts by weight) | Third layer |
|---|---|---|---|
| a1 | Yttrium hydroxide (1.8) | Nickel hydroxide (100) Cobalt hydroxide (1.1) | Cobalt hydroxide (4.7) |
| a2 | Yttrium hydroxide (1.8) | Nickel hydroxide (100) Cobalt hydroxide (1.1) Zinc hydroxide (4.2) | Cobalt hydroxide (4.7) |
| b | Cobalt hydroxide (4.1) | Nickel hydroxide (100) Cobalt hydroxide (1.0) | Cobalt hydroxide (4.6) |
| c | — | Nickel hydroxide (100) Cobalt hydroxide (1.2) | Cobalt hydroxide (4.4) |
| d | — | Nickel hydroxide (100) Cobalt hydroxide (1.1) Yttrium hydroxide (8.2) | Cobalt hydroxide (4.2) |

As shown in FIG. 1, in comparative example 3, the increase in filling density along with the increase in the number of fillings is the lowest. That is because the amount of added yttrium hydroxide is large and the apparent specific gravity in the state where nickel hydroxide and yttrium hydroxide are mixed is low as shown in Table 1. Therefore, an electrode with high capacity density cannot be obtained in comparative example 3. Consequently, an alkaline storage battery with high capacity density as desired at present cannot be obtained.

Figure 2:
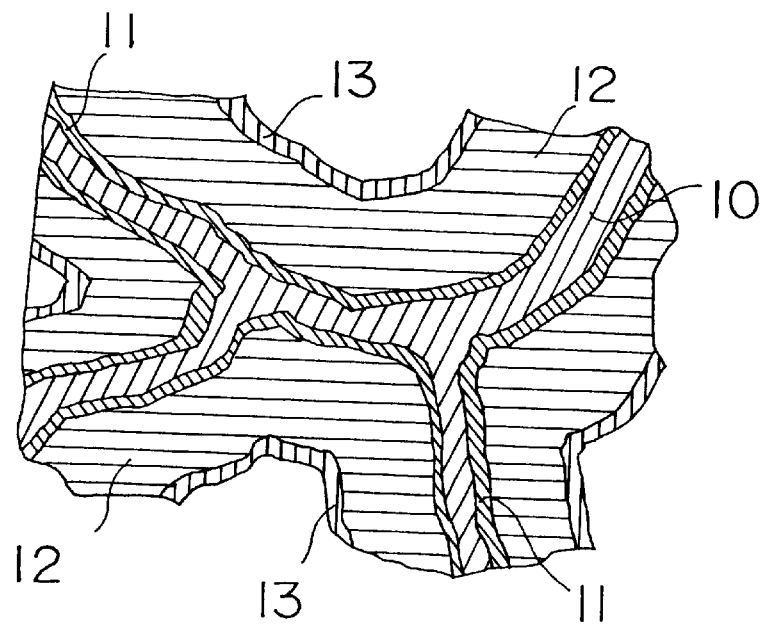
FIG. 2 is a schematic sectional view of the nickel positive electrode plate in an embodiment of the present invention.
Figure 3:
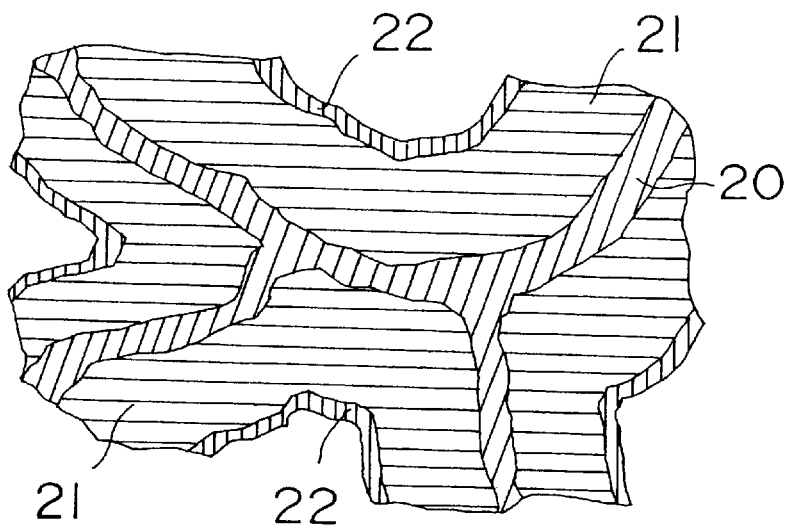
FIG. 3 is a schematic sectional view of the nickel positive electrode plate in comparative example 3.

Next, the cross sections of positive electrodes "a1", "a2" of the embodiments of the present invention and positive electrode "d" of comparative example 3 were examined using an electron probe microanalyzer (EPMA). A schematic cross section of positive electrode "a1" is shown in FIG. 2 and that of positive electrode "d" is shown in FIG. 3.

In these figures, the numeral 10 indicates the skeleton of sintered nickel substrate. FIG. 2 shows a first layer 11 of yttrium hydroxide formed in contact with the skeleton nickel metal 10, with a second layer 12 composed of a mixture of nickel hydroxide and cobalt hydroxide formed so as to cover the layer 11. And a third layer of cobalt hydroxide is formed so as to cover the second layer 12. The positive electrode "a2" is the same as the positive electrode "a1" except that the second layer 12 is composed of a mixture of nickel hydroxide, cobalt hydroxide and zinc hydroxide. In FIG. 3, a layer 21 composed of nickel hydroxide, cobalt hydroxide and yttrium hydroxide is formed in contact with the skeleton nickel metal 20. And another layer 22 composed of cobalt hydroxide is formed so as to cover the layer 21.

In another test, the above-described batteries A1, A2, B, C and D were charged at 140 mA for 15 hours in a 20° C. atmosphere and discharged at 280 mA until the terminal voltage dropped to 1.0 V to obtain the discharge capacities of the respective batteries. Then, each of these batteries was charged at 140 mA for 15 hours in an atmosphere of 50° C. and then discharged for 3 hours in an atmosphere of 20° C., subsequently, the batteries were discharged at 280mA until the terminal voltage dropped to 1.0 V, thereby obtaining the discharge capacities. The results were shown in Table 2.

TABLE 2

| | Charged at 20° C. | | Charged at 50° C. | |
|---|---|---|---|---|
| Battery | Discharge capacity (mAh) | Utilization (%) | Discharge capacity (mAh) | Utilization (%) |
| A1 | 1500 | 98 | 1410 | 92 |
| A2 | 1490 | 98 | 1398 | 92 |
| B | 1500 | 98 | 945 | 60 |
| C | 1440 | 98 | 1250 | 85 |
| D | 1300 | 98 | 1165 | 88 |

As is evident from Table 2, the utilization of the active material can be substantially improved by adding yttrium or cobalt when filling the active material nickel hydroxide in the sintered nickel substrate. It is also noted that as additive, yttrium is more effective than cobalt. Furthermore, as shown in FIG. 2, a small amount of yttrium can improve utilization of the active material at high temperatures by forming yttrium in direct contact with the nickel skeleton without mixing with nickel hydroxide.

The battery A1 using the positive electrode of Embodiment 1 and the battery C using the positive electrode of comparative example 2 were charged at 140 mA for 15 hours in an atmosphere of 50° C., and then left for 3 hours in an atmosphere at 20° C. Subsequently, the batteries were discharged at 280 mA until the terminal voltage dropped to 1.0 V. The charge and discharge curves in this test are shown in FIG. 4.

Figure 4:
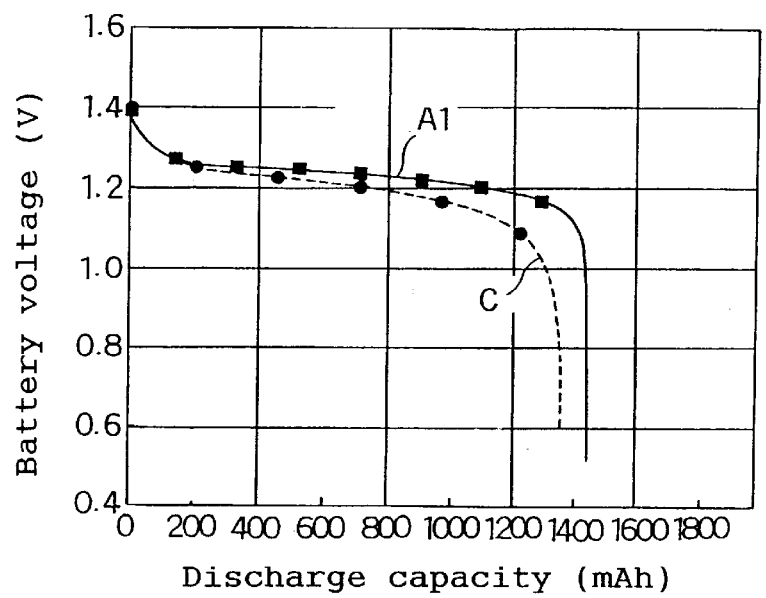
FIG. 4 is a graph showing discharge curves of battery A using the positive electrode plate of Embodiment 1 and battery C using the positive electrode plate of comparative example 2.

FIG. 4 shows that the battery A1 is high in discharge capacity as compared with the battery C. That is presumably because the positive electrode in the battery A1 contains smaller amount of cobalt hydroxide in comparison with the battery C, so it was able to keep down the decrease in the equilibrium electrode potential of nickel hydroxide.

Figure 5:
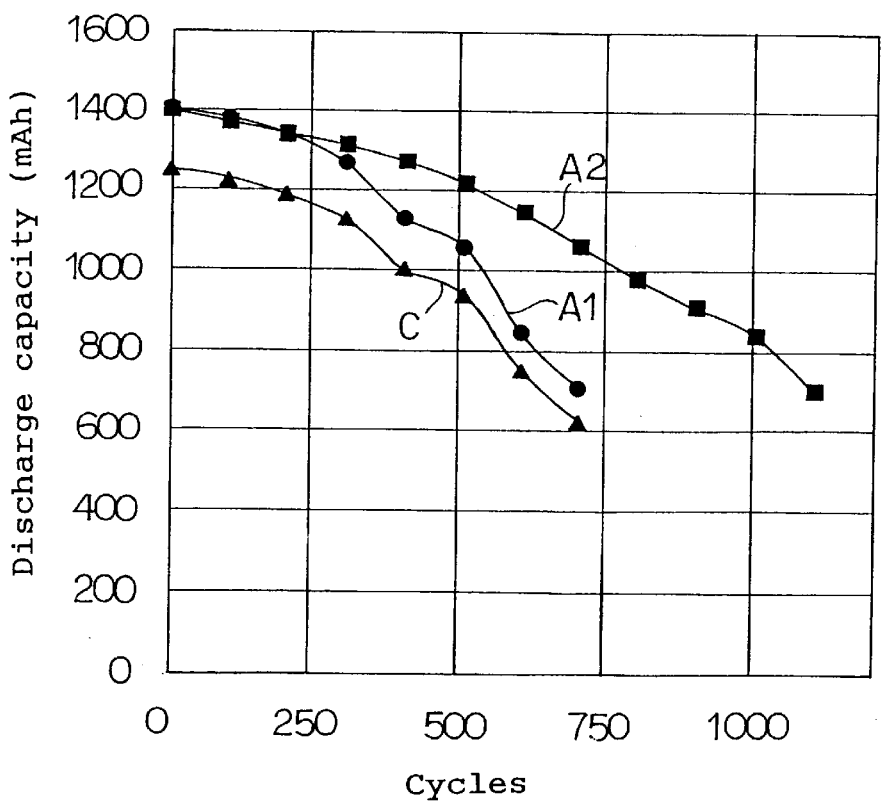
FIG. 5 is a graph illustrating changes in discharge capacity with charge and discharge cycles of battery A1 using the positive electrode plate of Embodiment 1, battery A2 using the positive electrode plate of Embodiment 2 and battery C using the positive electrode plate of comparative example 3.

In another test, the batteries A1, A2 and C were charged at 140 mA for 15 hours in an atmosphere of 50° C., and left for 3 hours in an atmosphere of 20° C. Then the batteries were discharged at 280 mA until the terminal voltage dropped to 1.0 V. This charge and discharge cycle was repeated. The test results are illustrated in FIG. 5.

It was judged that the charge and discharge cycle life came to an end when the capacity decreased to 60% of the initial capacity. As is evident from FIG. 5, the cycle life of the battery A1 was 600 cycles, the battery A2 1,000 cycles, and the battery C 600 cycles. It is assumed that the reason that the battery A2 has especially long in life is that the active material nickel hydroxide in the positive electrode is mixed with cobalt hydroxide and zinc hydroxide, and especially zinc hydroxide is effective in preventing the positive electrode from swelling when the battery is overcharged. As a result, the amount of electrolyte in the separator remains unchanged, thereby to extend the charge and discharge cycle life.

Industrial Applicability

As set forth above, the present invention provides a sintered type nickel electrode for alkaline storage batteries with a high capacity density that can keep down the decrease in the working voltage during discharge and shows a high utilization of the active material at a high temperature.

What is claimed is:

1. A nickel positive electrode comprising a porous sintered nickel substrate and metal hydroxides mainly composed of nickel hydroxide impregnated in said substrate, the metal hydroxides including: a first layer comprising a hydroxide of at least one element selected from the group consisting of yttrium, ytterbium and lutetium, and being in contact with said substrate; a second layer comprising a mixture of nickel hydroxide and cobalt hydroxide, and covering the first layer; and a third layer comprising cobalt hydroxide and covering the second layer.

2. The nickel positive electrode in accordance with claim 1, wherein the hydroxide in the first layer is 1 to 4 parts by weight, the amount of cobalt hydroxide in the second layer is 1 to 5 parts by weight, and the amount of cobalt hydroxide in the third layer is 3 to 6 parts by weight, each per 100 parts by weight of the nickel hydroxide.

3. The nickel positive electrode in accordance with claim 1, wherein the second layer further comprises zinc hydroxide.

4. The nickel positive electrode in accordance with claim 3, wherein the amount of zinc hydroxide in the second layer is 3 to 6 parts by weight per 100 parts by weight of the nickel hydroxide.

5. A method for producing a nickel electrode plate comprising the steps of:

(1) forming a first layer comprising a hydroxide of at least one element selected from the group consisting of yttrium, ytterbium and lutetium in pores of a porous sintered nickel substrate by conducting at least once a procedure including dipping said substrate in an acidic aqueous solution of a salt of at least one element selected from the group consisting of yttrium, ytterbium and lutetium, followed by drying and dipping the same in an alkaline aqueous solution to convert the salt into a hydroxide, (2) forming a second layer comprising a mixture of nickel hydroxide and cobalt hydroxide on the first layer of said substrate by conducting at least once a procedure including dipping said substrate in an acidic aqueous solution containing a nickel salt and a cobalt salt, followed by drying and dipping the same in an alkaline aqueous solution to convert the nickel salt and cobalt salt into nickel hydroxide and cobalt hydroxide, respectively, and (3) forming a third layer comprising cobalt hydroxide on the second layer by conducting at least once a procedure including dipping said substrate in an aqueous solution of a cobalt salt, followed by drying and dipping the same in an alkaline aqueous solution to convert the cobalt salt into cobalt hydroxide.

6. A method for producing a nickel electrode plate comprising the steps of:

(1) forming a first layer comprising a hydroxide of at least one element selected from the group consisting of yttrium, ytterbium and lutetium in pores of a porous sintered nickel substrate by conducting at least once a procedure including dipping said substrate in an acidic aqueous solution of a salt of at least one element selected from the group consisting of yttrium, ytterbium and lutetium, followed by drying and dipping the same in an alkaline aqueous solution to convert the salt into yttrium hydroxide, (2) forming a second layer comprising a mixture of nickel hydroxide, cobalt hydroxide and zinc hydroxide on the first layer of said substrate by conducting at least once a procedure including dipping said substrate in an acidic aqueous solution containing a nickel salt, a cobalt salt and a zinc salt, followed by drying and dipping the same in an alkaline aqueous solution to convert the nickel salt, cobalt salt and zinc salt into nickel hydroxide, cobalt hydroxide and zinc hydroxide, respectively, and (3) forming a third layer comprising cobalt hydroxide on the second layer by conducting at least once a procedure including dipping said substrate in an aqueous solution of a cobalt salt, followed by drying and dipping the same in an alkaline aqueous solution to convert the cobalt salt into cobalt hydroxide.

* * * * *